3,365,502
Patented Jan. 23, 1968

3,365,502
5-OXYGENATED-5,6-SECO-B-NORGONANES
George H. Douglas, Paoli, Charles R. Walk, King of Prussia, and Herchel Smith, Wayne, Pa., assignors to American Home Products Corporation, New York, N.Y., a corporation of Delaware
No Drawing. Filed Mar. 22, 1966, Ser. No. 536,263
6 Claims. (Cl. 260—613)

This invention relates to compositions of matter classifiable in the art of chemistry as 5-oxygenated-5,6-seco-B-norgonanes and to process for preparing them.

The invention sought to be patented in its principal composition aspect, is described as residing in the concept of a 13-lower alkyl-3-lower alkoxy-5,6-seco-B-norgona-1,3,5(10)-trien-5,17β-diol.

The tangible embodiment of the composition aspect of the invention possess the inherent general physical properties of being high melting, white crystalline solids, are substantially insoluble in water, and are generally soluble in organic solvents such as ether and chloroform. Examination of the compounds produced according to the hereinafter described process reveals, upon ultraviolet, infrared, and nuclear magnetic resonance spectrographic analysis, spectral data supporting the molecular structure hereinbefore set forth. For example, the two hydroxyl groups and the hydrogens of the two C-alkyl groups are evident in the nuclear magnetic resonance and the resorinol-like structure of the A-ring is evident in the infrared and ultraviolet. The aforementioned physical characteristics, taken together with the nature of the starting materials, and the mode of synthesis, confirm the structure of the compositions sought to be patented.

The tangible embodiments of the invention possess the inherent applied use characteristic of exerting an anti-lipemic effect in animals as evidenced by pharmacological testing according to standard test procedures.

The invention sought to be patented in its process aspect resides in the concept of converting a 13-alkyl-3-alkoxy-6-oxagona-1,3,5(10),8-tetraene-17β-ol to a 13-alkyl-3-alkoxy-5,6-seco-B-nor-1,3,5(10)-trien-5,17β-diol by chemical reduction with a dissolving metal reagent.

The process of the invention and the manner of making a specific embodiment of the compositions of the invention are illustrated schematically as follows:

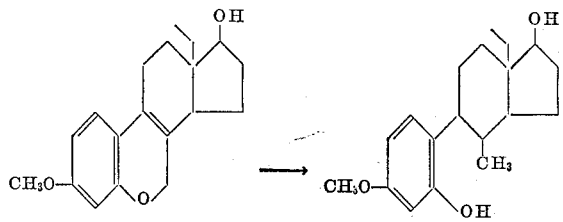

The process and manner of making the compositions of the invention will now be generally described so as to enable a person skilled in the art of chemistry to make and use the same as follows:

The 6-oxagona-1,3,5(10),8-tetraenes employed as starting materials in the process of the invention and for the preparation of the compositions are prepared as described in co-pending U.S. application Serial No. 483,528 filed August 30, 1965. When said tetraenes are reduced with a dissolving metal reagent such as an alkali metal in liquid ammonia, the applicants have discovered that the reaction which would be expected by analogy with the corresponding carbocyclic gonane, i.e. reduction of the 8,9-unsaturation, is not selective, and that there is obtained instead a 5,6-seco-B-nor derivative. Lithium in liquid ammonia is the preferred agent for the reduction although any conventional chemical reduction dissolving metal reagent can be employed. For best results the lithium metal is added slowly and in small pieces in such a fashion as to just keep the liquid ammonia mixture blue.

The product is isolated by conventional procedures, e.g. decomposition of unreacted metal and metal-amide, evaporation of ammonia by gradual warming, extraction of organic materials into ether, washing of the organic layer, drying and evaporating the solvent. The isolated product is then purified by recrystallization from a suitable solvent.

It will be apparent from the disclosure herein to those skilled in the art that for the purposes of this invention certain of the atoms of the 6-oxagona-1,3,5(10),8-tetraene starting materials could be otherwise substituted with groups which do not interfere with the subsequent reactions. Thus the alkoxy group at the 3-position could be methoxy as illustrated in the drawing or it could be, for example, but without limiting the generality thereof, ethoxy, propoxy, isopropoxy, butoxy, or cycloalkoxy such as cyclopentyloxy and cyclohexyloxy. The alkyl group at the 13-position can be methyl or polycarbon alkyl such as, for example, but without limiting the generality thereof, ethyl, propyl, butyl, and cetyl. The A-ring could also be substituted with alkyl or alkoxy groups or other groups which do not interfer in the course of the subsequent reaction in the 1, 2, and 4-positions. The 17-position can be substituted with hydroxy as illustrated or other groups derivable therefrom such as an ester, or convertible thereto such as a keto-group without interfering in the process of the invention.

When the starting compounds are substituted, as hereinbefore recited, it will be apparent herefrom to those skilled in the art of organic chemistry that the products produced therefrom will bear correspondingly the same substituents. Therefore, for the purpose of the invention they are the full equivalents of the invention as particularly claimed.

The compositions of the invention can be formulated for their anti-lipemic use as solid capsules, tablets, etc., by combining with conventional carriers. The effective dosage depends upon the particular compound used and the characteristic of the case and can be determined by conventional methods. Generally a dosage range from 0.10 to about 15 mg. per kilogram of body weight per day represents the overall range.

The following example illustrates the best mode contemplated by the inventors of using the process of the invention and of the manner of making the compositions of the invention:

EXAMPLE 1

*Preparation of 13-methyl-3-methoxy-5,6-seco-B-norgona-1,3,5(10)-triene-5,17β-diol*

Add 13-methyl-3-methoxy-6-oxagona-1,3,5(10),8-tetraene-17β-ol (3.3 g.) in tetrahydrofuran (100 ml.) to a solution of distilled liquid ammonia (350 ml.) containing aniline (15 ml.), with stirring. Slowly add just enough lithium metal to keep the mixture blue (ca. 800 mg.). Stir for one hour after completion of the addition of the metal, and then destroy the blue color by adding a few drops of acetone. Add dilute acetic acid and warm water to decompose the ammonia complex. Extract with ether to collect the organic product. Wash the extract with water, 10 percent aqueous hydrochloric acid, water, and dry over sodium sulfate. Remove the solvent and crystallize the residue from ether to obtain the title compound (700 mg.), M.P. 141–146°.

$\lambda_{max.}^{EtOH}$ 282 and 288 mμ (ε3,580) and (ε3,400).

$\lambda_{max.}^{KBr}$ 2.93, 3.16, 6.20 and 6.27 μ.

EXAMPLE 2

*Preparation of 13-ethyl-3-methoxy-5,6-seco-B-norgona-1,3,5(10)-triene-5,17β-diol*

Following the procedure of Example 1, but employing 13-ethyl-3-methoxy-6-oxagona-1,3,5(10),8-tetraene - 17β-ol as the starting material, there is obtained 13-ethyl-3-methoxy-5,6-seco-B-norgona-1,3,5(10)-triene - 5,17β-diol, M.P. 191–194°.

$\lambda_{max.}^{EtOH}$ 282 and 287 mμ (ε3,300).

$\lambda_{max.}^{KBr}$ 2.94, 3.13, 6.20 and 6.30 μ.

Analysis for $C_{19}H_{28}O_3$: Calculated: C, 74.96%; H, 9.27%. Found: C, 75.00%; H, 9.26%.

The subject matter which the applicants regard as their invention is particularly pointed out and distinctly claimed as follows:

1. 13 - lower alkyl - 3 - lower alkoxy - 5,6 - seco - B - norgano-1,3,5(10)-triene-5,17β-diol.

2. The composition of claim 1 wherein the 13-lower alkyl group is methyl and the 3-lower alkoxy group is methoxy.

3. The composition of claim 1 wherein the 13-lower alkyl is ethyl and the 3-lower alkoxy group is methoxy.

4. The process for converting a 13-alkyl-3-alkoxy-6-oxagona-1,3,5(10),8-tetraen-17-ol to a 13-alkyl-3-alkoxy-5,6-seco-B-norgona-1,3,5(10)-triene-5,17β-diol by chemical reduction with an alkali metal in liquid ammonia.

5. The process of claim 4 wherein the 13-alkyl group is methyl and the 3-alkoxy group is methoxy.

6. The process of claim 4 wherein the 13-alkyl group is ethyl and the 3-alkoxy group is methoxy.

References Cited

UNITED STATES PATENTS 2,886,589   5/1959   Novello _____ 260—613 X
3,275,691   9/1966   Goldberg et al. ____ 260—613 X

OTHER REFERENCES

Smith et al.: Jour. Chem. Soc. (London) (1964), pp. 4472–4482.

BERNARD HELFIN, *Primary Examiner.*